United States Patent [19]
Yoshimura

[11] 3,712,194
[45] Jan. 23, 1973

[54] CAMERA SHUTTER

[75] Inventor: Hirofumi Yoshimura, Okaya, Japan

[73] Assignee: Kabushiki Kaisha Yashica, Shibuya-ku, Tokyo-to, Japan

[22] Filed: July 1, 1971

[21] Appl. No.: 158,795

[30] Foreign Application Priority Data

July 3, 1970 Japan .................................. 45/57755

[52] U.S. Cl. .............................. 95/10 CT, 95/10 CE
[51] Int. Cl. .......................... G03b 7/08, G03b 9/62
[58] Field of Search .............. 95/10 CT, 53 EB, 64 A

[56] References Cited

UNITED STATES PATENTS 3,602,717   8/1971   Konig .............................. 95/10 CT
3,613,534  10/1971   Yazaki ............................. 95/64 A

*Primary Examiner*—Samuel S. Matthews
*Assistant Examiner*—Russell E. Adams, Jr.
*Attorney*—Stanley Wolder

[57] ABSTRACT

An automatic shutter timing network for a single lens reflex camera including a selective automatic preset and manually adjustable diaphragm includes a bridge network including in its legs a photoconductor exposed to through the lens light, the output of a first transistor and the resistance element of potentiometer having a fixed contact and a contact adjustable with the automatic diaphragm adjustment. The input of a second transistor is connected to the bridge output, one terminal of which is alternatively switched to the potentiometer movable or fixed contact with the selection of automatic or manual diaphragm. A memory capacitor is charged by an amplifier controlled by the second transistor output and controls the resistance of the first transistor in an inverse feedback loop. An RC timing network includes as a resistance element a transistor having an input signal responsive to the memory capacitor charge and controls the actuation of the shutter closure release by way of an amplifier switch.

8 Claims, 2 Drawing Figures

INVENTOR
HIROFUMI YOSHIMURA
BY Stanley Wolder
ATTORNEY

CAMERA SHUTTER

BACKGROUND OF THE INVENTION

The present invention relates generally to improvements in camera automatic timing mechanism and it relates particularly to an improved automatic shutter timing mechanism for a single lens reflex camera having a through-the-lens light measuring system and provided with an objective lens diaphragm which is of the type which is selectively automatically preset or manually adjusted.

The objective diaphragm aperture adjusting or stopping mechanism in a single lens reflex camera having an electric shutter generally are of the automatic preset and manual adjusting type which are selective at will in photographing to either type of operation.

The automatic stopping is effected by setting a knob on a lens holder of the objective to the automatic indicia (Auto) and the objective aperture is thus maintained completely opened independently of the adjustment of the diaphragm ring. With the knob set to the Auto, the objective is stopped to a preset aperture only upon shutter release and the image in the view finder is accordingly bright and clear to facilitate the focussing and composing of the subject to be photographed. On the other hand, the manual to is effected by setting the knob to the manual indication (Manual) and the objective diaphragm aperture is stopped according t the adjustment of the diaphragm adjusting ring. The diaphragm aperture is, accordingly, determined independently of factors such as shutter release and mirror movement.

With the knob once set to the automatic stopping, the diaphragm aperture is different before and after the shutter release while, with the knob set to manual the aperture is constant. With the electric shutter of through the objective light measuring system wherein the adjustable diaphragm aperture value is temporarily converted, the illumination intensity of an object to be photographed on the photosensitive element does not correspond to that on the film surface in the case of automatic stopping.

This is for the reason that the light coming from an object to be photographed is incident on the photosensitive element through the completely opened objective and is incident on the film surface through the objective stopped to a smaller aperture. There is no problem consequent to such light difference in the manual aperture adjustment because light coming from an object to be photographed is incident through the objective stopped to a desired aperture on the photosensitive element and on the film surface. Information corresponding to diaphragm aperture is electrically stored in a control circuit for the camera electric shutter in the case of manual stopping. On the other hand, various means are provided for storage of such information into said control circuit in consideration of the diaphragm aperture variation in the case of automatic diaphragm stopping. There is provided, for example, an arrangement such that a connecting rod is rotated as the diaphragm regulating ring is operated and a slideable resistance disposed in said control circuit is varied by said rotation of the connecting rod so as to transmit the requirement for regulation of diaphragm aperture value.

The present invention contemplates an improvement in the means for storage of the requirement for regulation which is thus transmitted by the objective stopping mechanism into the control circuit for the electric shutter arranged on camera body side.

SUMMARY OF THE INVENTION

It is a principal object of the present invention to provide an improved light responsive automatic shutter timing mechanism.

Another object of the present invention is to provide an improved light responsive automatic shutter timing mechanism for a single lens reflex camera provided with a through the lens light measuring system.

Still another object of the present invention is to provide an improved light responsive automatic shutter timing mechanism for a single lens reflex camera having a through the lens light measuring system and provided with an object lens diaphragm which is selectively automatically preset or manually adjustable in which the shutter timing is automatically adjusted for use with the automatic or manual diaphragm condition.

A further object of the present invention is to provide a light responsive automatic shutter timing mechanism of the above nature characterized by its reliability, accuracy, ruggedness, compactness, versatility and adaptability.

The above and other objects of the present invention will become apparent from a reading of the following description taken in conjunction with the accompanying drawing which illustrates a preferred embodiment thereof.

In a sense the present invention contemplates the provision, in a single lens reflex camera with a through the lens light measuring system and provided with an objective lens having a diaphragm which is selectively automatically preset or manually adjustable, of a shutter timing mechanism comprising a photoconductor exposed to light traversing the camera objective lens, a network for producing a signal responsive to the resistance of the photoconductor and either to a resistance relationship which is responsive to the diaphragm preset value when the diaphragm is in an automatic condition or to a fixed resistance relationship when the diaphragm is in a manual condition, a memory capacitor, means for charging the memory capacitor in response to said signal, a shutter closure release member, and means responsive to said timing network for actuating the release member.

In its preferred form the timing network comprises the photoconductor, the output of a first transistor and opposite sides of the resistance element of a potentiometer connected as a bridge. The potentiometer includes a contact movable with the adjustment of the automatic diaphragm and a fixed contact and a switch has an arm coupled to the selection member for automatic or manual diaphragm to alternatively engage the movable or fixed contact respectively. A second transistor has an input connected to the bridge output as defined by the switch arm and the junction point of the first transistor and the photoconductor. The output of the second transistor is connected in inverse feedback through an amplifier to the input of the first transistor to automatically balance the bridge and the memory capacitor is positioned in the amplifier network and the amplifier network is opened by a camera mirror switch immediately before the memory capacitor which is connected across the input of a stage of the amplifier. The timing network includes a timing capacitor in series with the output of a transistor whose input corresponds to that of the first transistor.

DESCRIPTION OF THE PREFERRED EMBODIMENT

Figure 1:
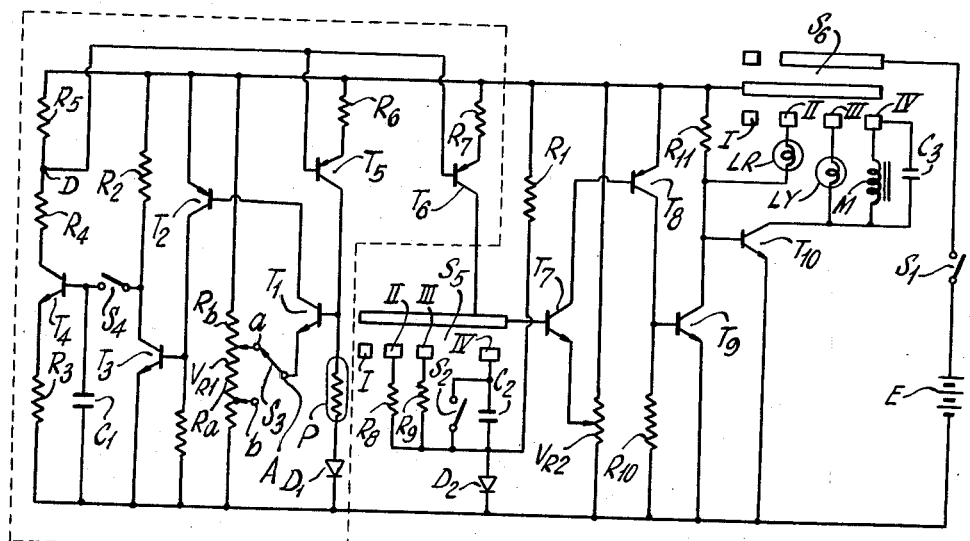
FIG. 1 is a circuit diagram of an automatic shutter time control network embodying the present invention.
Figure 2:
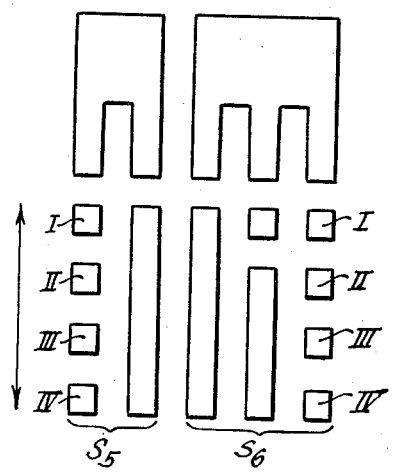
FIG. 2 is a schematic view of the release switches of said network illustrating the sequentially actuated contacts.

Now referring to the accompanying drawing which illustrates a preferred embodiment of the present invention, $VR_1$ designates a variable resistance provided with an automatic diaphragm set contact $a$ and a Manual diaphragm contact $b$, the contact $a$ being movable in operative association with a diaphragm adjusting ring so that the radio of resistance divisions $R_a$ and $R_b$ of said variable resistance $VR_1$ varies while the contact $b$ is stationary so that variable resistance $VR_1$ is divided at a predetermined ratio independently of manipulation of the diaphragm regulating ring.

A change-over switch $S_3$ includes an arm connected alternatively to each of said contacts $a$ and $b$, and is adapted to change-over connection to contacts $a$ and $b$ for selective storage of automatic and manual diaphragm value information. A photoconductor P serving as an element to sense light coming through the objective lens from an object to be photographed is connected to the collector of a transistor $T_5$ so that the resistance of photoconductor P and the output resistance of transistor $T_5$ are divided at the junction point of these two elements.

A transistor $T_1$ has its base connected to junction point B and its emitter connected to a common contact A of the change-over arm of switch $S_3$. There is formed a bridge circuit comprising division resistances $R_a$ and $R_b$ of variable resistance $VR_1$ photoconductor P and transistor $T_5$ while transistor $T_1$ provides a circuit serving to detect information on light coming from an object to be photographed on the basis of potential comparison.

$T_2$ and $T_3$ designate tandem connected transistors whose input is coupled to the output of transistor $T_1$ and serve to control an electric current according to information detected by said detecting circuit so that the electric charge of a capacitor $C_1$ is under this control.

Capacitor $C_1$ is connected through a resistor $R_4$ between the base and emitter of a transistor $T_4$ for determination of the range in which said transistor $T_4$ controls an electric current.

A switch $S_4$ connected between transistor $T_3$ collector and transistor $T_4$ base is opened or closed in operative association with the operation of a mirror in the manner that said switch $S_4$ is opened and closed synchronously with the start of upward swinging and the end of downward swinging of the camera mirror, respectively. $T_6$ designates a transistor which is adapted to be selectively connected through a release switch $S_5$ to a timing capacitor $C_2$ and has its base connected to a junction point D in a feedback circuit of information value which is, in turn, arranged on the collector side of transistor $T_4$.

Transistor $T_5$ which forms a part of said detecting circuit or bridge also has its base connected to a junction point D of series resistors, $R_4$ and $R_5$ connect to the collector of transistor $T_4$ so that inverse feedback of information is affected.

The detection circuit is serially connected to a battery or power source E and the transistors $T_2$, $T_3$ and $T_4$ are parallel connected to said detection circuit between the collector and emitter electrodes thereof, respectively.

$S_5$ and $S_6$ designate release switches adapted to operate in operative association with the successive stages of depressing a shutter release button and each of these switches $S_5$ and $S_6$ has sequential contacts I, II, III and IV.

The power source E is maintained open under closure of the contact I and shutter release takes place under closure of the contact IV. The contact II is used to provide an indication of a limit beyond which the shutter speed will be too high while the contact III is used to provide an indication of another limit beyond which the shutter speed will be too low to permit the hand support of the camera.

$T_7$, $T_8$, $T_9$ and $T_{10}$ designate transistors which form together a switching circuit adapted to operate under action of a RC timing circuit consisting of the transistor $T_6$ and the timing capacitor $C_2$, $L_R$ a lamp adapted to be lit under closure of the contacts II of said switches $S_5$ and $S_6$ when the shutter speed exceeds the maximum limit, and $L_y$ another lamp adapted to be lit under closure of the contacts III of the same switches when the shutter speed is too low to avoid a hand quake.

M designates an electromagnet serving as a shutter screen closure release element, $R_1$, $R_2$,....$R_{11}$ resistances of which $R_8$ and $R_9$ are used to identify corresponding shutter speeds, $S_2$ a short circuit switch adapted to be opened synchronously with the opening of the leading shutter screen, $D_1$ and $D_2$ diodes, $C_3$ a capacitor, $S_1$ a power source switch, and $VR_2$ a variable resistance varying in response to difference of factors such as the film sensitivity.

In the network described above, the power source switch $S_1$ is closed with the film transport and shutter charge which occur in operative association with the operation of a film transport lever, but the circuit of the electric shutter remains disconnected from the power source since the release switches $S_5$ and $S_6$ which are operatively associated with depression of the shutter button remain open.

When the release switches $S_5$ and $S_6$ are closed at their contacts II by depressing the shutter button, each circuit begins to be energized by the power source E. Now, on the assumption that the arm of change-over switch $S_3$ which is selectively transferred by the user into one of the contacts $a$ and $b$ is thrown, as shown, into engagement with automatic contact $a$, this contact $a$ is shifted in accordance with the adjustment of the diaphragm ring so that the variable resistance $VR_1$ is divided according to such adjustment and the ratio of such division is maintained at $R_b/R_a$. On the other hand, the photoconductor P has its resistance varying during light measuring through the completely opened diaphragm, and the value of the resistance at this point is maintained at $Z_p$.

When the output impedance of the transistor $T_5$ (including the resistance $R_6$) is referred to as $ZT_5$, said detecting circuit is stabilized under the requirement for balancing expressed by $Z_{T5}/Z_p = R_b/R_a$.

On the assumption that said balanced state is lost due to variation of the variation of the divided resistance values $R_a$ and $R_b$ which vary with the diaphragm preset adjustment or due to variation of the resistance $Z_p$ of the photoconductor P and the relationship $Z_{T5}/Z_p < R_b/R_a$ is established, a potential appears between the common contact A and the junction point B.

This potential corresponds, therefore, to illumination intensity of an object to be photographed under a predetermined requirement of regulation and with this potential the transistors $T_2$ and $T_3$ attain their conductive range. Then, the capacitor $C_1$ begins to be discharged under the current control of transistor $T_3$, reducing the base voltage of transistor $T_4$. As a result, the collector current of transistor $T_4$ is reduced, so that the voltage at the junction point D of the feedback circuit is shifted in the direction of dropping and the voltages on the control electrodes of the transistors $T_5$ and $T_6$ are thereby also reduced.

Accordingly, the output impedance $Z_{T5}$ of transistor $T_5$ is increased, stabilizing the detecting circuit. Specifically, such as increase of the output impedance $Z_{T5}$ of the transistor $T_5$ brings about a stabilized state which satisfies the requirement for balancing expressed by $Z_{T5}/Z = R_b/R_a$.

The base of the transistor $T_6$ is also in a state of voltage drop, so that the output impedance thereof increases and this output impedance provides together with the capacity of the capacitor $C_2$ a time constant based on which the exposure time of the electric shutter is determined.

Shift of the balanced state to $Z_{T5}/Z_p = R_b/R_a$ reverses the direction of the voltage between the detecting circuit components, so that the transistor $T_3$ becomes non-conductive and the capacitor $C_1$ begins to be charged. Consequently the transistor $T_4$ is controlled in the direction of current increase and there occurs a voltage increase at the junction point D of the feedback circuit, reducing the output impedance of each of transistors $T_5$ and $T_6$ so that the requirement for balancing $Z_{T5}/Z_p = R_b/R_a$ is satisfied.

As a result, the detecting circuit is maintained stable and the output impedance of the transistor $T_6$ at this stabilized state and the capacitor $C_2$ serve to determine the exposure time of the electric shutter.

The manner in which the operation of the device of the present invention has been described above is in connection with the case of automatic stopping. In the case of manual stopping, the change-over switch $S_3$ is changed over (by shifting a knob on the lens holder to Manual-side) to the Manual contact b so that the requirement of regulation at manual stopping is stored by the electric shutter.

More specifically, the divided resistance values $R_a$ and $R_b$ of the variable resistance $VR_1$ is fixed in the case of manual stopping independently of adjustment of the diaphragm ring and any variation in the inner resistance $Z_p$ of the photoconductor P produces a potential in said detecting circuit.

The output impedance $Z_{T5}$ of the transistor $T_5$ is controlled according to this potential, controlling the requirement of balancing of the detecting circuit so that the collector current of the transistor $T_6$ is controlled under said requirement of balancing.

In this embodiment, as seen from the aforegoing description, a predetermined output impedance of transistor $T_6$ is given at the first half of shutter release or upon closure of the contacts II of the switches $S_5$ and $S_6$ and, if the lamp $L_R$ is not lit in the relationship between the conductivity controlling current and the resistance $R_8$ on this time point, the shutter button is subsequently depressed for closure of the contacts III. If the lamp $L_y$ is not lit also in the relationship between said conductivity controlling current and the resistance $R_9$, the shutter button is depressed to the second half for closure of the contacts IV. Now the capacitor $C_2$ is charged with said conductivity controlling current and the switching circuit comprising the transistors $T_7$, $T_8$, $T_9$ and $T_{10}$ operates according to the time constant effected by the controlled output impedance of the transistor $T_6$ and capacitor $C_2$ so that an electromagnet M under control of said switching circuit brings the shutter lagging screen into the range in which said shutter lagging screen may be actuated and shutter release occurs.

The capacitor $C_1$ has already been charged to a predetermined level at the time that the mirror is swung upwardly and the switch $S_4$ is opened as the shutter is released, so that the output impedance of the transistor $T_6$ and, therefore, the electric shutter itself are not affected even when the photoconductor P is blocked from the light coming from an object to be photographed.

According to the present invention, furthermore, it is possible to make a detecting mechanism store the illumination intensity of an object to be photographed in form of storage information corresponding to the requirement of regulation for storage of said requirement of regulation in automatic stopping and to maintain said detecting mechanism stabilized by partial feedback of said storage information as a control information serving to control said detecting mechanism at a balanced state. Moreover, it is possible to vary the timing factor for determination of the exposure time of the electric shutter with said storage information obtained when said detecting mechanism is in stabilized state and to add the requirement corresponding to the regulated value to the electric shutter in the state that the process of information conversion is quite stable.

With the camera having automatic and manual stopping mechanisms, the requirement of regulation in selective operation of these mechanisms may be easily stored by the electric shutter only with manipulation of a change-over knob provided on the lens holder without any further manipulation and operation of the stopping mechanism for the electric shutter in a through-the-lens light measuring system may be greatly simplified as compared with those of conventional type. Even the use of a photoconductor of a relatively slow photosensitivity is practical according to the present invention, since it is required for the switch $S_4$ provided in the current control mechanism of the invention as shown by the embodiment merely to operate before the mirror begins to be swung upwardly.

The device of the invention may be stabilized in its practical operation and be free from demand for any adjustment without the use of an element such as a field effect transistor of high input impedance or complication of switching mechanism since the device is operatively separated into a converting mechanism including elements such as the detecting mechanism and the current controlling mechanism, a timer circuit of the electric shutter including elements such as the timing circuit and the switching circuit, a member serving to control the requirement for balancing such as a transistor, and a current control member. Furthermore, the regulated diaphragm value may be varied during checking of the shutter speed even in the case of automatic stopping, so that it is not required to return the release button and to repeat checking every time the diaphragm value is varied during checking.

While there has been described and illustrated a preferred embodiment of the present invention it is apparent that numerous alterations, omissions and additions may be made without departing from the spirit thereof.

What is claimed is:

1. A shutter timing mechanism in a single lens reflex camera including an objective lens comprising a photoconductor exposed to light traversing said objective lens, a memory capacitor, means for charging said capacitor in response to the resistance of said photoconductor and including an inverse feedback amplifier having said photoconductor in its input and said memory capacitor normally connected to an output of said amplifier independently of the charge on said capacitor, an RC timing network including a timing capacitor and a resistance element responsive to the charge on said memory capacitor switch means responsive to the opening sequence of the shutter for disconnecting said memory capacitor from said inverse feedback amplifier, shutter closure release means, and means responsive to said timing network for actuating said release means.

2. The shutter timing mechanism of claim 1 including means for varying the charge on said memory capacitor independently of said photoconductor.

3. The shutter timing mechanism of claim 1 wherein said memory capacitor charging means comprises a bridge including in the respective legs thereof the output of a first transistor, said photoconductor and a pair of resistance elements, and a second transistor having the base and emitter thereof connected to respective opposite corners of said bridge.

4. The shutter timing mechanism of claim 3 wherein said camera objective includes selective automatic preset and a manually adjustable diaphragm said bridge resistance elements comprising opposite sections of the resistance element of a potentiometer including an adjustable contact responsive to the setting of said automatic diaphragm and a fixed contact, and a switch responsive to the selection of said automatic or manual diaphragm control for alternatively respectively connecting said adjustable or fixed contact to said second transistor.

5. The shutter timing mechanism of claim 1 wherein said timing network resistance element comprises a transistor whose output connected in series with said timing capacitor and means responsive to an output of said amplifier for applying a signal to the base of said transistor to vary the resistance of said resistance in accordance with the charge on said memory capacitor.

6. A shutter timing mechanism in a single lens reflex camera including a shutter closure release member, an objective lens, an automatic preset and manually adjustable diaphragm, and selector means for alternatively selecting the automatic or manual diaphragm adjustment, a memory capacitor, a photoconductor exposed to light traversing said objective lens, means responsive to the resistance of said photoconductor and the position of said selector means and the adjustment of said automatic diaphragm when said selector means is in its automatic diaphragm condition for normally controlling the charge on said memory capacitor, means responsive to the opening shutter sequence for disabling said charge controlling means, timing means responsive to the charge on said memory capacitor, and means responsive to said timing means for actuating said shutter closure release member.

7. The shutter timing mechanism of claim 6 wherein said memory capacitor charging means comprises a bridge network including the resistance element of a potentiometer and said photoconductor in legs thereof said potentiometer including an adjustable contact coupled to said automatic diaphragm adjustment and a fixed contact, and a switch mechanically coupled to said diaphragm selector means for alternatively connecting said diaphragm contacts to the output of said bridge, and means including an inverse feedback loop including said bridge network for charging said capacitor.

8. The shutter timing mechanism of claim 7, wherein said switch includes a terminal alternatively engaging said potentiometer contacts and comprising a first transistor having its output electrodes connected in said bridge in series with said photoconductor and a second transistor having its input electrodes connected to said switch terminal and the junction of said first transistor and photoconductor respectively and an amplifier including said memory capacitor connecting the output of said second transistor to the input of said first transistor in an inverse feedback direction.

* * * * *